United States Patent [19]

Florin

[11] Patent Number: 4,519,487

[45] Date of Patent: May 28, 1985

[54] ALTERNATE MANUAL OR POWER AUXILIARY CONTROL DEVICE FOR CONTROLLING WINDING DOORS OR THE LIKE

[75] Inventor: Guy Florin, Cluses, France

[73] Assignee: Somfy, Cluses, France

[21] Appl. No.: 446,264

[22] Filed: Dec. 2, 1982

[30] Foreign Application Priority Data

Dec. 30, 1981 [FR] France ............................... 81 24527

[51] Int. Cl.³ ........................ E06B 9/204; F16D 11/10

[52] U.S. Cl. ........................................ 192/36; 192/54; 192/93 A; 192/95; 74/625; 160/319

[58] Field of Search ................. 74/625; 192/36, 93 A, 192/95, 54; 160/319, 291, 307

[56] References Cited

U.S. PATENT DOCUMENTS

| | | | |
|---|---|---|---|
| 3,217,847 | 11/1965 | Petrak | 192/93 A X |
| 3,740,146 | 6/1973 | Willharm | 192/95 X |
| 4,238,014 | 12/1980 | Petrak | 192/93 A X |
| 4,281,749 | 8/1981 | Fogelberg | 192/93 A X |
| 4,352,418 | 10/1982 | Teraoka | 192/36 |
| 4,382,495 | 5/1983 | Fleitas | 192/36 |

FOREIGN PATENT DOCUMENTS

| | | | |
|---|---|---|---|
| 1650788 | 11/1970 | Fed. Rep. of Germany | 74/625 |
| 2612628 | 9/1977 | Fed. Rep. of Germany . | |
| 2270193 | 12/1975 | France . | |
| 0648760 | 2/1979 | U.S.S.R. | 192/93 A |

*Primary Examiner*—Rodney H. Bonck
*Assistant Examiner*—David D. House
*Attorney, Agent, or Firm*—Balogh, Osann, Kramer, Dvorak, Genova & Traub

[57] ABSTRACT

This auxiliary control device for manually and rotatably driving, for example in case of failure of the current supply system, a motor and reduction gear unit kinematically connected for example to a winding door or grille, a sectional door, or the like, comprises a pulley adapted when rotated to cause the axial movement of a sliding member through the medium of a cam device disposed across the pulley and the sliding member. This sliding member comprises on the one hand a set of dogs of a first half-coupling which are adapted to engage the dogs of another set rigid with the main driven shaft, and on the other hand noses adapted to engage guiding projections formed on a rotary braking member disposed coaxially to the pulley. When the dogs of the two sets engage each other the noses are fully disengaged from the guiding projections and thus the rotary braking member does not exert any antagonistic torque likely to counteract the actuation of the auxiliary control device.

2 Claims, 6 Drawing Figures

ALTERNATE MANUAL OR POWER AUXILIARY CONTROL DEVICE FOR CONTROLLING WINDING DOORS OR THE LIKE

BACKGROUND OF THE INVENTION

The present invention relates to auxiliary devices for controlling winding doors or grilles, sectional doors or the like, of the type comprising a rotary control member adapted to be rotated manually in case of failure of the electric motor and reduction unit for example as a consequence of a short or break in the current supply system. This manual rotation of the rotary control member causes the axial movement of a sliding member coaxial to said control member against the force of resilient means through the medium of a cam device disposed in the interface between the control member and the sliding member. This sliding member supports a half-coupling adapted, beyond a predetermined sliding movement, to cooperate with a second matching half-coupling supported by the main shaft driving the motor and reduction unit connected kinematically to the winding door or grille, sectional door or the like. A device is provided for generating an antagonistic torque counteracting the rotation of the sliding member in order to cause the axial movement of this sliding member.

THE PRIOR ART

In known auxiliary control devices of this character such as disclosed in the French Pat. No. 2,270,193 and German Pat. No. 26 12 628, the means contemplated for creating an antagonistic torque capable of counteracting the rotation of the sliding member supporting the first half-coupling consists of a friction device constantly counteracting the rotation of said sliding member. Now this solution is objectionable for when the user of the winding door or grill, sectional door or the like wishes to operate manually the auxiliary control device he is confronted with the difficulty of overcoming the resistance of this friction device not only during the short time period in which the two half-couplings engage each other but also throughout the period in which the door or grille is being opened or closed.

SUMMARY OF THE INVENTION

The auxiliary control device according to the present invention is characterized essentially in that the means provided for generating an antagonistic torque consists of a rotary braking member disposed coaxially to the sliding member and responsive to friction means. This rotary braking member comprises at least one protruding guide means extending towards the second half-coupling and adapted to be slidably engaged by a corresponding nose carried by the sliding member and extending in the direction opposite said guide means, so that the sliding member is caused to slide towards the second half-coupling. The heights of the guide portions of the protruding guide means and of the nose carried by the sliding member are such that the axial movement of the sliding member which results therefrom is shorter than the axial movement resulting from the cam device. Thus, when the two half-couplings engage each other, the protruding guide means of the rotary braking member are no longer on path of collision with the nose of the sliding member.

According to an advantageous form of embodiment of the invention given by way of illustration, not of limitation, the rotary braking member consists of a ring of which the inner cylindrical portion is adapted to cooperate through friction means with the outer cylindrical periphery of a hollow fixed support having a cylindrical inner portion constituting the bearing of the control member proper.

With the auxiliary control device according to the present invention the inconveniences of the prior art devices are safely avoided by limiting the effect of the device contemplated for generating an antagonistic torque during the short time period in which the two half-couplings engage each other, and also by suppressing this effect throughout the period necessary for opening or closing the winding door or grille, or sectional door, or the like, thus reducing inasmuch the manual effort necessary for performing these opening or closing operations.

THE DRAWINGS

DESCRIPTION OF THE PREFERRED EMBODIMENT

Figure 1:
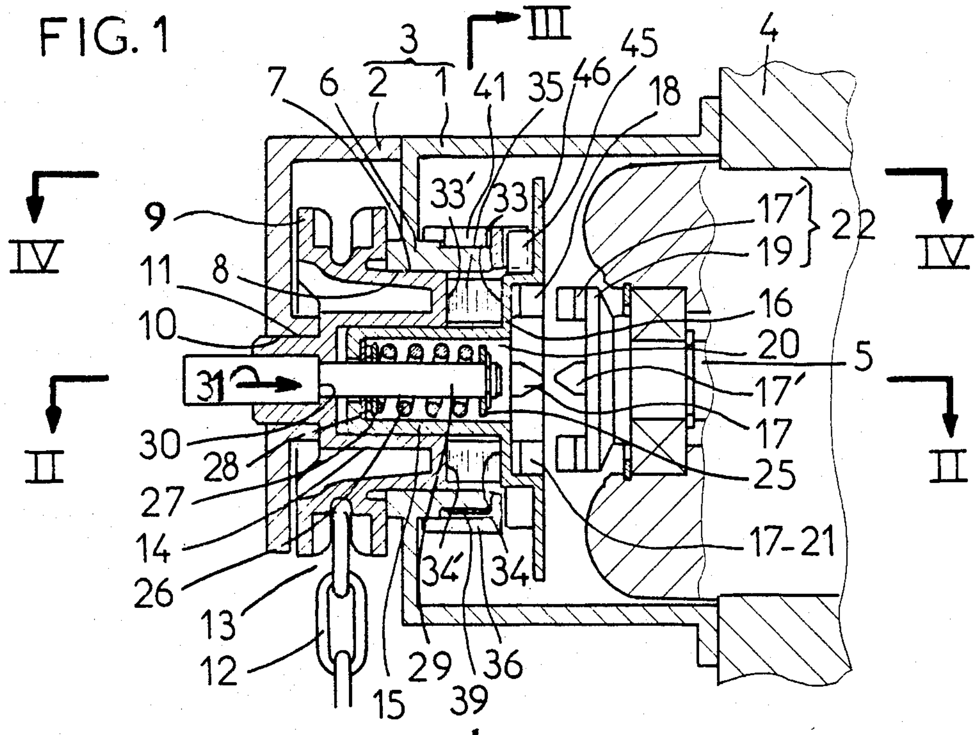
FIG. 1 illustrates a typical form of embodiment of the device of this invention, shown in longitudinal section taken along the line I—I of FIG. 2.

As illustrated notably in FIG. 1, the auxiliary control device according to the present invention is enclosed in a case 3 fastened for example to the stator 4 of a motor and reduction unit constituting the main drive. This case 3 constitutes in this example the axial extension of the main or output drive shaft 5 of the motor and reduction unit. The case 3 comprises a first section 1 secured to the motor and reduction unit 4 and a second section 2 secured to the first section 1.

The end of the first case section 1 remotest from shaft 5 comprises an internal cylindrical support 6 having an inner bore 7 adapted to constitute a bearing for rotatably supporting a first lateral cylindrical journal portion 8 of a pulley 9 coaxial to shaft 5. Another lateral cylindrical journal 10 of pulley 9, disposed on the other side of the pulley in relation to the first journal portion 8, is pivotally mounted in a bearing 11 formed in the second section 2 of case 3, which is coaxial to bearing 7. This pulley 9 is grooved for supporting an endless chain 12 (FIG. 1) emerging from the case 3 through a lower aperture 13. (FIG. 1, for simplification purposes, shows only the lower suspended portion of the chain). The shaft 5 and the pivot axis of pulley 9 are disposed horizontally when operative, in this specific form of embodiment. Thus, in this example the pulley 9 constitutes the rotary control member adapted to be rotated manually when necessary. In another example the rotary control member could have a different form and be rotated if desired by means of a crank handle The pulley 9 and its first lateral journal portion 8 are provided with an internal axial and concentric cylindrical bore 14 opening only towards the drive shaft 5. Slidably and rotatably mounted in this bore 14 is a sliding member 15 adapted to move both axially and rotatably therein. This sliding member 15 is formed in turn with an inner cavity 20 opening only towards drive shaft 5 through an annular plate 16 formed integrally with this sliding member 15. Formed in turn in this annular plate 16 are front-dogs 17, four in number in this example, constituting a first half-coupling 21. The sides of these dogs 17 extend radially towards the axis of rotation of sliding member 15 and have pointed ends 18. The output shaft 5 of the motor and reduction unit carries at its end a second half-coupling 22 comprising an annular plate 19 supporting four front dogs 17' identical with and facing the dogs 17 of the first half-coupling.

The sliding member 15 is constantly urged away from the second half-coupling 22 by a coil compression spring 26 disposed in cavity 20. In fact, this spring 26 is disposed between a thrust ball-bearing 27 reacting against the bottom 28 of cavity 20 and a retaining washer 25 disposed at one end of a shaft 29 mounted in turn in said cavity 20. This shaft 29 extends through the thrust ball-bearing 27, the bottom 28 of cavity 20, and the second lateral cylindrical journal 10. A radial face 30 of this shaft 29 which faces the second half-coupling 22 prevents the shaft 29 from being moved axially by spring 26 in the direction of the arrow 31 towards the other half-coupling 22.

A cam device is disposed between the annular plate 16 of sliding member 15 and the registering front face 32 (FIG. 2) of the first cylindrical journal 8 of pulley 9. In fact, this annular plate 16 comprises two diametrally opposed double and similar ramps 33', 34' supported by said front face 32. Disposed between each pair of ramps 33,33' and 34, 34', respectively, is a roller 35. Thus, the two rollers 35 themselves are diametrally opposed. The ramps are constantly urged against the rollers 35 by spring 26. The rollers 35 are held in their axial positions on the one hand by bearing 7 and on the other hand by the cylindrical outer periphery of sliding member 15.

Figure 2:
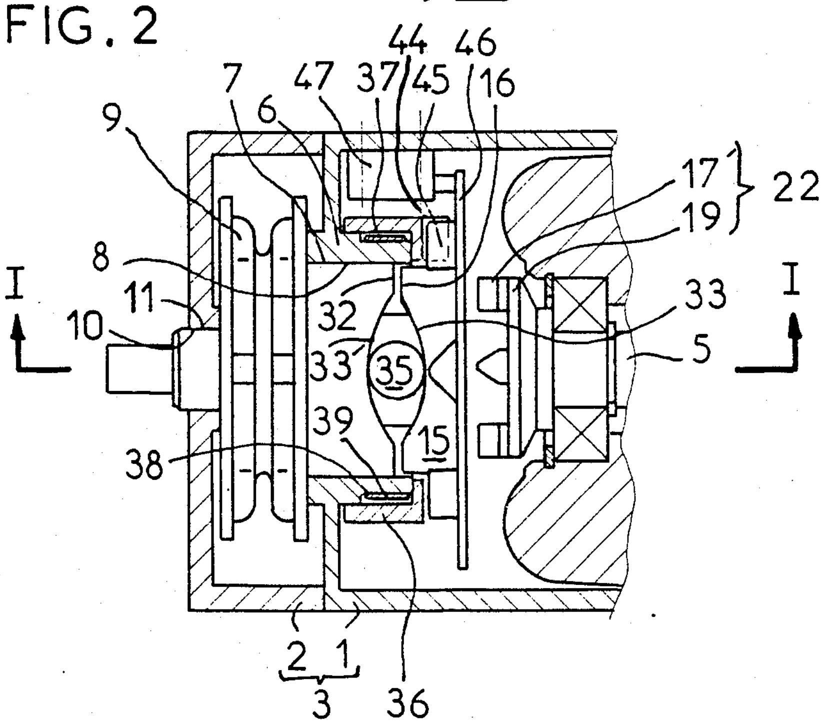
FIG. 2 is a fragmentary longitudinal section taken along the line II—II FIG. 1.
Figure 3:
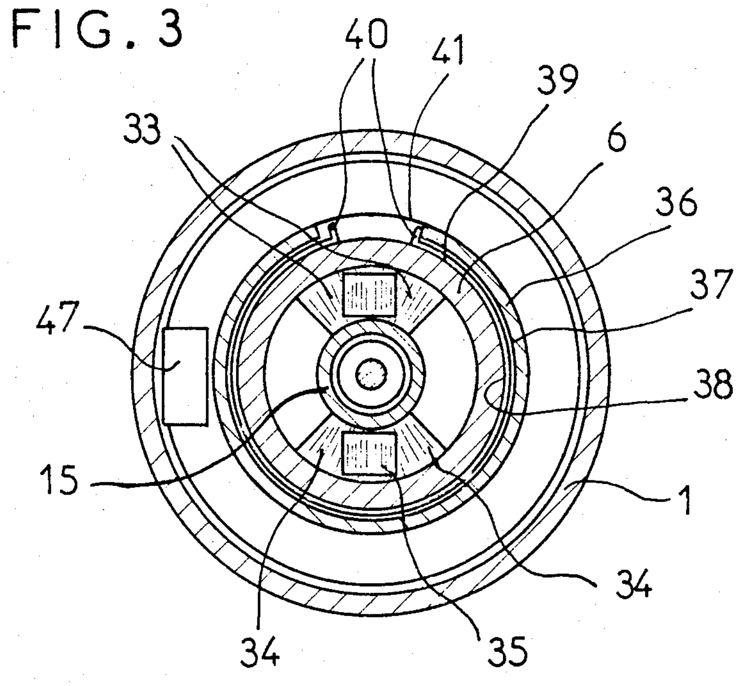
FIG. 3 is another section take along the line III—III of FIG. 1.

As illustrated notably in FIGS. 1–3, means are provided for generating an antagonistic torque capable of counteracting the rotation of sliding member 15 when the pulley 9 is rotatably driven. This means comprises in the example illustrated a rotary braking member 36 disposed coaxially in relation to sliding member 15 and responsive to friction means. In this example the rotary braking member 36 consists of a ring of which the inner cylindrical surface 37 is adapted to cooperate with one portion of the cylindrical outer periphery or surface 38 of cylindrical support 6. Disposed between these two cylindrical surfaces 37 and 38 is a spring blade 39 constantly exerting a frictional pressure on the cylindrical surface 38 and provided at either end with external radial lugs 40 (FIG. 3) received in a recess 41 formed through the wall of the rotary braking member 36. This spring blade 39 constitutes the friction element of braking member 36. This braking member comprises on its front face for example four guiding projections 44 spaced 90 degrees apart from one another and protruding in the direction of the second half-coupling 22. In this specific form of embodiment, these guiding projections 44 have inclined sides so as to have a pointed configuration. These four guiding projections 44 are adapted to be engaged in sliding contact by four corresponding noses 45 also of pointed configuration carried by the sliding member 15 and also spaced 90 degrees apart from one another; these noses 45 are formed on an annular flange 46 constituting an extension of plate 16 in co-planar relationship with the end of dogs 17. The height of the guiding projections 44 and of the corresponding noses 45 are such that the axial movement of sliding member 15 which results therefrom is shorter than the axial movement resulting from the action of the cam device.

A miniswitch 47 closed when actuated by the outer edge of annular flange 46 in the direction opposed to direction 31 is fastened to the inner wall of the first section 1 of case 3.

When the auxiliary control device is inoperative its component elements are in the positions shown in FIGS. 1–3, with spring 26 constantly urging the sliding member 15 in the direction opposed to 31 and the bottom of the double ramps 33, 34 holding the rollers 35 against the bottom of the double ramps 33' and 34', respectively. Thus, pulley 9 and sliding member 15 are in the position of equilibrium illustrated more particularly in FIG. 3. In this position the guiding projections 44 do not engage the noses 45. The dogs 17 of the first half-coupling 21 are caused to recede in the direction opposed to 31 and therefore are disengaged from the dogs other half-coupling 22. The edge of annular flange 46 retains the miniswitch 47 in its closed position and the main drive shaft 5 can be driven freely by the motor and reduction unit for rotation in one or the other direction.

Figure 4:
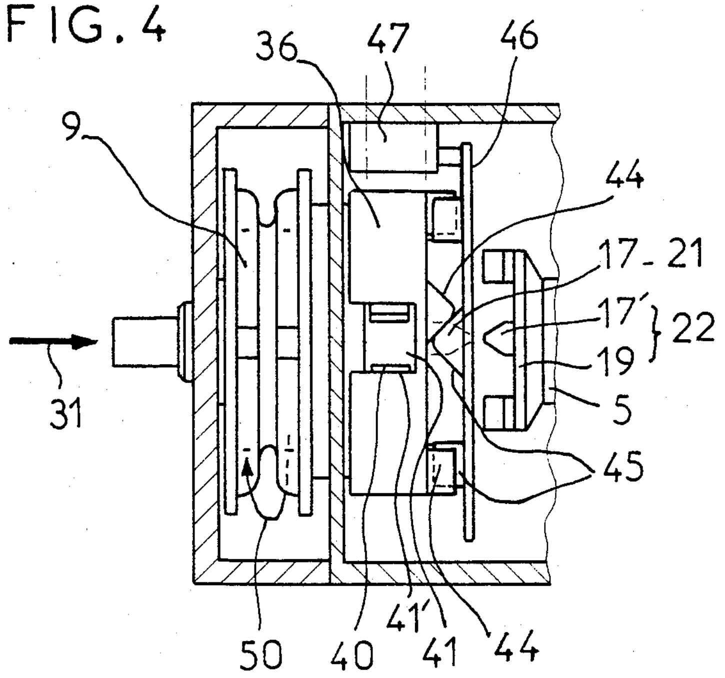
FIGS. 4,5 and 6 are sections taken along the line IV—IV of FIG. 1, but showing the same form of embodiment of the invention during different steps of its operation.
Figure 5:
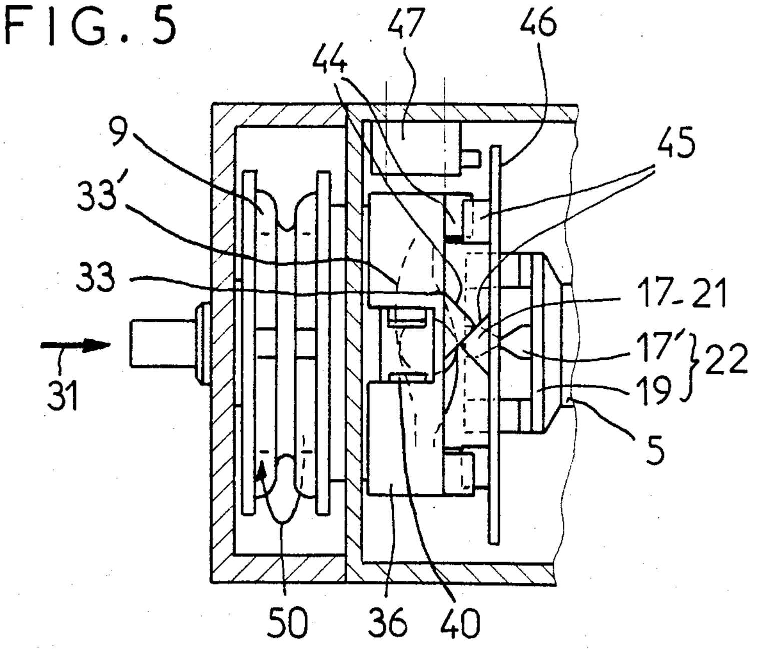
Figure 6:
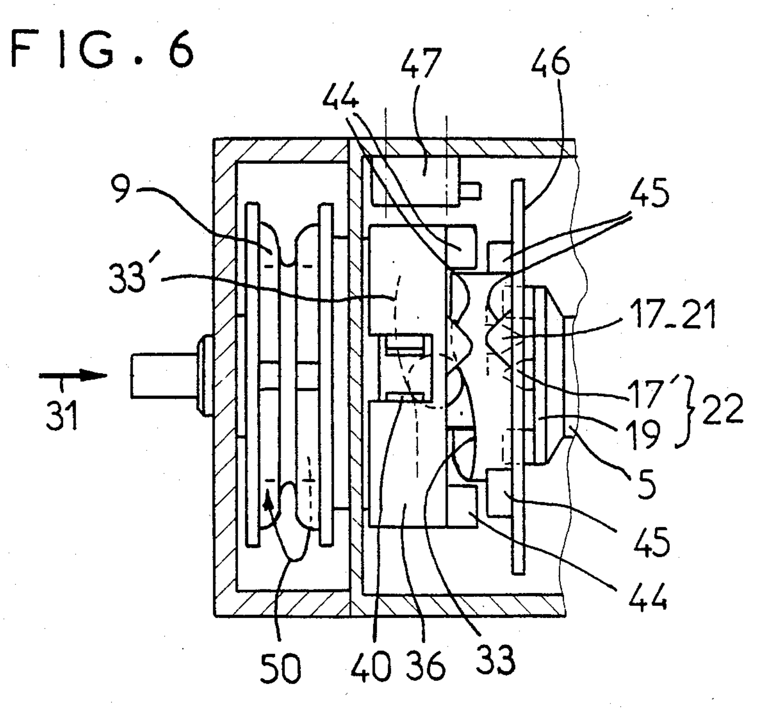

Now if the user wants to actuate the main drive shaft 5 manually, for example as a consequence of a failure in the current supply system, he simply pulls the chain 12 downwards (FIG. 1) to rotate the pulley 9 for example in the direction of the arrow 50 (FIGS. 4–6). Due to the tension of spring 26, the pulley 9 will firstly cause the sliding member 15 to rotate at the same speed, until the noses 45 of this member 15 engage the guiding projections 44 the rotary braking member 36, so that this member 36 will now be driven in the same direction 50 until one of the lugs 40 engages the rear side 41' (FIG. 4) of cavity 41; thus, the frictional contact with the spring blade 39 will tend to prevent the rotation of the rotary braking member 36 and also of the sliding member 15. Therefore, the various component elements of the device will assume the positions shown in FIG. 4. As the pulley 9 is still driven for rotation in the direction 50, the double ramps 33', 34' become angularly off-set in relation to the other pair of double ramps 33, 34 which, via rollers 35, are thus pushed in the axial direction 31 together with the sliding member 15 and the dogs 17 of the first half-coupling 21. During this movement the noses 45 slide between the inclined guiding projections 44 as shown in FIG. 5, and at the same time the sliding member 15 is slightly rotated while the miniswitch 47 is released and therefore opened by the edge of annular flange 46. With this arrangement, any undesired or accidental starting of the motor and reduction gearing unit 4 is safely prevented, even when the supply of current from the mains is restored.

In case the tips of dogs 17 just engage dogs 17', as shown in FIG. 5, the axial movement of sliding member 15 will be momentarily and positively prevented, thus causing the rotation of this member 15 and also of the rotary braking member 36, notwithstanding the resilient force of spring blade 39. When the dogs 17 and 17' are slightly off set angularly to each other the movement of the first set of dogs towards the second set of dogs is resumed, so that the rotary braking member 36 and the spring blade 39 generate again an antagonistic torque counteracting the rotation of sliding member 15.

In case the tips of dogs 17 were not aligned with those of dogs 17', nothing prevents the former from penetrating immediately into the clearances of the latter when the sliding member 15 moves towards the other half-coupling 22.

In all cases the various component elements eventually are in the position shown in FIG. 6. In this position, the dogs 17 and 17' fully engage one another and on the other hand the noses 45 are cleanly disengaged from the guiding projections 44 since the heights of these projections 44 and of the noses 45 are such that the resulting axial movement of sliding member 15 is shorter than the axial movement (in the direction 31) caused by the action of the double ramps 33,33' and 34,34'. Thus, the rotary braking member 36 does not exert any antagonistic torque likely to counteract the actuation of the auxiliary control device. If the pulley's rotation is continued in the direction 50, the shaft 5 is caused to rotate in this direction 50 and the winding door or grille, the sectional door, or the like, is opened or closed.

When the user stops pulling the chain 12 the spring 26 causes the backward movement of sliding member 15, this movement being possibly attended by a slight rotation of pulley 9, so that the complete auxiliary control device resumes its inoperative position (FIG. 1), the pointed configuration of noses 45 and guiding projections 44 facilitating the interpenetration of these elements. Thus, the motor and reduction unit may again be controlled electrically, since the miniswitch 47 is now reclosed.

The auxiliary control device of this invention may be used for controlling notably winding doors or grilles, section doors and like structures.

What is claimed is:

1. An auxiliary control device for winding doors or grilles, sectional doors, or the like, which comprises a rotary control member adapted to be actuated manually and rotatably for producing the axial translation of a sliding member coaxial to the control member against the force of a resilient means through the medium of a frontal cam device disposed transversely between said control member and said sliding member, said sliding member supporting a first half-coupling adapted, beyond a predetermined sliding movement, to engage a corresponding second half-coupling supported by a main drive shaft controlling the winding door or grille, sectional door or the like, a device being provided for producing an antagonistic torque counteracting the rotation of said sliding member, wherein said device capable of producing an antagonistic torque consists of a rotary braking member disposed coaxially to said sliding member and responsive to a friction element, said rotary braking member comprising at least one guiding projection extending towards said second half-coupling and adapted to be contacted and slidably engaged by a corresponding nose, extending in the direction opposed to the direction of said guiding projection, provided on said sliding member, so as to cause said sliding member to slide towards said second half-coupling, the heights of said guiding projection and nose respectively being such that the axial movement of said sliding member is shorter than the axial movement resulting from the action of said cam device.

2. The auxiliary control device of claim 1, wherein said rotary braking member consists of a ring having an inner cylindrical portion which is adapted, with the interposition of friction means, to cooperate with an outer cylindrical periphery of a fixed cylindrical support of which the inner cylindrical portion constitutes a journal for mounting said control member.

* * * * *